(12) United States Patent
Liu et al.

(10) Patent No.: US 9,104,724 B2
(45) Date of Patent: Aug. 11, 2015

(54) DYNAMIC BRIDGING OF APPLICATION AND DATA SERVERS

(71) Applicant: SAP AG, Walldorf (DE)

(72) Inventors: Xiaowei Liu, Shanghai (CN); Yingyu Chen, Shanghai (CN)

(73) Assignee: SAP SE (DE)

( * ) Notice: Subject to any disclaimer, the term of this patent is extended or adjusted under 35 U.S.C. 154(b) by 205 days.

(21) Appl. No.: 13/798,364

(22) Filed: Mar. 13, 2013

(65) Prior Publication Data

US 2014/0258321 A1   Sep. 11, 2014

(30) Foreign Application Priority Data

Mar. 11, 2013   (CN) .......................... 2013 1 0075685

(51) Int. Cl.
  *G06F 17/30*   (2006.01)
(52) U.S. Cl.
  CPC .................................. *G06F 17/3043* (2013.01)
(58) Field of Classification Search
  None
  See application file for complete search history.

(56) References Cited

U.S. PATENT DOCUMENTS

| | | | |
|---|---|---|---|
| 6,687,677 B1 | 2/2004 | Barnard et al. | |
| 7,003,494 B2 | 2/2006 | Beach et al. | |
| 7,320,122 B2 | 1/2008 | Chawla et al. | |
| 7,490,319 B2 | 2/2009 | Blackwell et al. | |
| 7,739,670 B2 | 6/2010 | Gutfleisch et al. | |
| 7,836,424 B2 | 11/2010 | Yard | |
| 8,407,237 B1 | 3/2013 | Kudryavtsev et al. | |
| 8,468,172 B2 | 6/2013 | Block et al. | |
| 2005/0234801 A1* | 10/2005 | Zhang et al. .................... | 705/37 |
| 2008/0046868 A1 | 2/2008 | Tsantilis | |
| 2008/0306986 A1 | 12/2008 | Doyle, Sr. | |
| 2012/0173581 A1 | 7/2012 | Hartig et al. | |
| 2012/0331350 A1 | 12/2012 | Dhoolia et al. | |
| 2013/0036115 A1 | 2/2013 | Schwarz et al. | |
| 2013/0117414 A1 | 5/2013 | Dash | |
| 2013/0125098 A1 | 5/2013 | Dhoolia et al. | |

\* cited by examiner

*Primary Examiner* — Wilson Lee
(74) *Attorney, Agent, or Firm* — Horizon IP Pte. Ltd.

(57) ABSTRACT

Described herein is a technology to facilitate dynamic bridging of an application server and a data server. In accordance with one aspect, a query script based on source code of an application is generated at the application server. The query script may include at least one placeholder that represents a dynamic term in the source code of the application. The query script may be processed by replacing the placeholder with a static term generated based on one or more values received during execution of the application. The query script is then executed to manage data at a data server.

20 Claims, 3 Drawing Sheets

| Row | SIGN[C(1)] | OPTION[C(2)] | LOW[C(18)] | HIGH[C(18)] |
|---|---|---|---|---|
| 1 | I | EQ | HANA::PERF00009 | |
| 2 | I | EQ | HANA::PERF00500 | |
| 3 | I | BT | HANA::HDR:06001 | HANA::HDR:06600 |
| 4 | E | EQ | 1214133-100 | |
| 5 | E | BT | HANA::HDR:06800 | HANA::HDR:06908 |

DYNAMIC BRIDGING OF APPLICATION AND DATA SERVERS

TECHNICAL FIELD

The present disclosure relates generally to databases and more specifically to dynamic bridging of application and data servers.

BACKGROUND

A database typically includes one or more database tables for storing data values. To access the data in the database, an application typically issues a database query to a Database Management System (DBMS) that retrieves the data from the database. The DBMS may be structured to support different types of operations from the requesting application server to retrieve, add, modify and/or delete data being stored in the database. The application then interprets the data retrieved from the data server and transforms the data into a format that can be processed by the application.

Typically, data is represented and manipulated differently in the application and data servers. The application may be written using a high level programming language that provides a high level of abstraction suited for developing business applications, such as developing custom reports and interfaces. Such high-level programming languages may allow dynamic selections of values and conditions for database access during run-time. Dynamic selections may be provided by the user during run-time to define the query to execute.

The data server, on the other hand, is typically structured to support operations that are programmed using a static query language that requires all variables and conditions to be defined or known at compilation (prior to run-time). One example of such static query language is static Structured Query Language ("SQL"), which has evolved as the standard language used by database systems to interpret what, where and how data is to be stored and manipulated. Static SQL statements do not change from execution to execution. The full text of static SQL statements is known at compilation.

To integrate application and data servers, it may be necessary to translate the application code to the query language that is compatible with the database server. However, it is difficult to perform such translation due to the complexity of existing business logic that is encoded in the application. In addition, it is also not easy to transform the data stored in the application's custom data types and structures to the database's native data types and structures.

One common method of integrating the application and database servers is to use dynamic SQL. Dynamic SQL is an extension of SQL that is executed by the database server and allows the data server to consider user input that is received during run-time in constructing an SQL query statement. Compared to static SQL, it provides more flexibility and allows the use of variables that may not be supported by static SQL.

However, executing dynamic SQL in the data server may have a negative impact on security. Since the variables are not known during compilation, verification to ensure that the query statement references valid database objects or necessary privileges are in place to access the database objects cannot be performed. In addition, opportunities for optimizations are limited, and the query statement is potentially recompiled each time the statement is executed.

Therefore, there is a need for an improved integration framework that addresses the above-mentioned challenges.

SUMMARY

A computer-implemented technology for facilitating dynamic bridging of application and data servers is described herein. In accordance with one aspect, a query script based on source code of an application is generated at the application server. The query script may include at least one placeholder that represents a dynamic term in the source code of the application. The query script may be processed by replacing the placeholder with a static term generated based on one or more values received during execution of the application. The query script is then executed to manage data at a data server.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
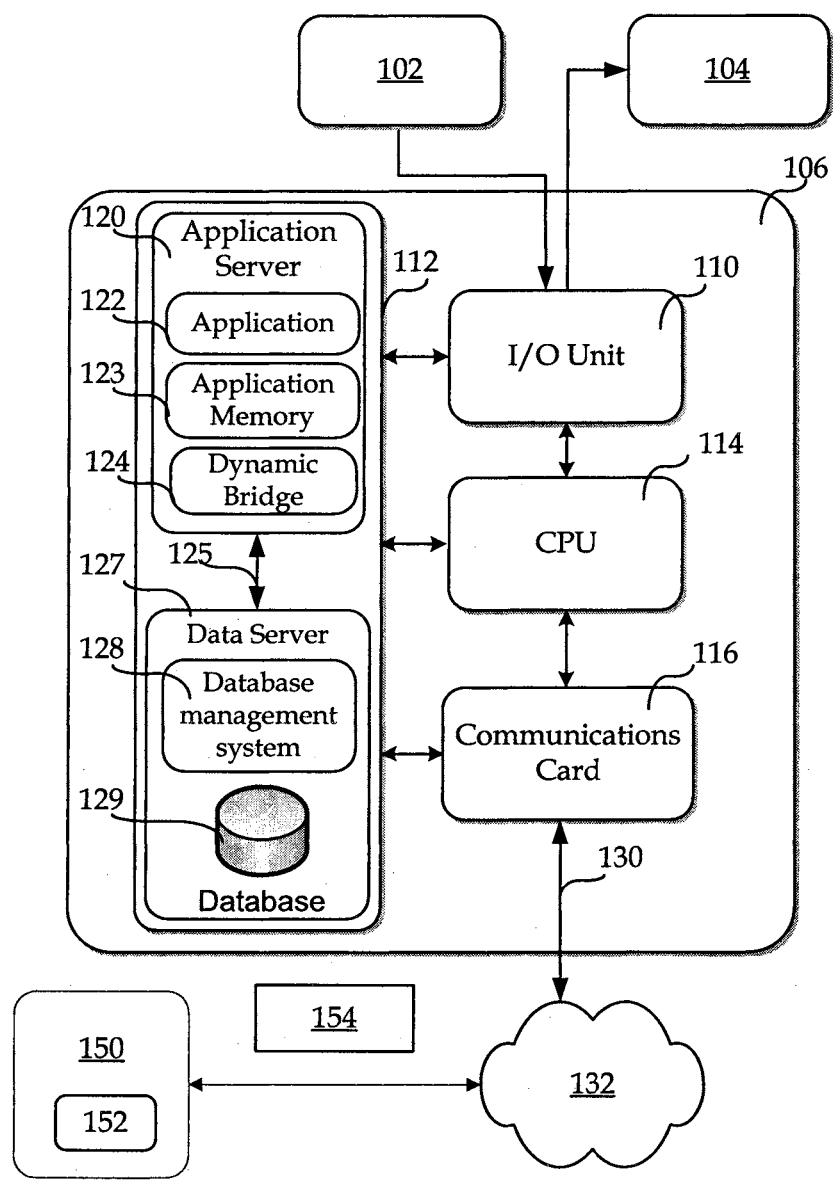
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating the dynamic bridging of application and business servers is described herein. One aspect of the present framework provides a dynamic bridge within an application server. The dynamic bridge generates a query script from the source code of an application. The application may be coded in a high-level programming language that allows dynamic selection of variables and conditions during runtime, while the query script may be coded in a static query language that is compatible with a data server.

In some implementations, the query script is generated by paraphrasing any dynamic term encountered in the application source code with a placeholder. A dynamic term may be, for instance, a condition or variable that is defined only during run-time of the application. The placeholder may be, for example, a predefined string of one or more symbols. After receiving actual values associated with the dynamic term during the execution of the application, the dynamic bridge may further process the query script by replacing it with a static term that is generated based on the actual values. The value of the static term is fixed and does not change during run-time. The dynamic bridge may further validate and format the query script. The final query script may then be executed directly by the application server, via a database interface, to retrieve results from the data server.

By preparing the query script at the application server, database-specific optimization of the query script may be performed at the application server's end to fully leverage the capability of the data server and enhance performance. The query script may be stored as a function module in the application server memory, making it more convenient for application developers to validate, release and fix the query script, if necessary. In addition, by avoiding the use of, for instance, dynamic SQL executed at the data server's end, the performance penalty and security risk associated with dynamic SQL are avoided or minimized. These and other advantages and aspects will be described in more detail in the following description.

The framework described herein may be implemented as a method, computer-controlled apparatus, a computer process, a computing system, or as an article of manufacture such as a computer-usable medium. These and various other features will be apparent from the following description.

FIG. 1 shows a block diagram illustrating an exemplary system 100 that may be used to implement the framework described herein. System 100 may include a computer system 106 communicatively coupled to an input device 102 (e.g., keyboard, touchpad, microphone, camera, etc.) and an output device 104 (e.g., display device, monitor, printer, speaker, etc.). Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 154 via network 132. For example, computer system 106 may act as a server and operate in a networked environment using logical connections to one or more client computers 150.

Computer system 106 includes a central processing unit (CPU) 114, an input/output (I/O) unit 110, and a memory module 112. Other support circuits, such as a cache, power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various software components for implementing the techniques described herein, all of which may be processed by CPU 114. As such, the computer system 106 is a general-purpose computer system that becomes a specific purpose computer system when executing the machine-executable instructions. Alternatively, the various techniques described herein may be implemented as part of a software product, which is executed via an application server 120. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the memory module 112 of the computer system 106 includes an application server 120 and a data server 127. The application server 120 may store an application 122, including source code and executable machine code, for performing the functions of the application. Application 122 may be, for example, a business application designed to perform various business functions, such as customer relationship management (CRM), enterprise resource management (ERP) application, human resource management, enterprise content management (ECM), business process management (BPM), product lifecycle management, business intelligence, and so forth. Application 122 may be coded using a high-level programming language that allows dynamic selection of variables and conditions during run-time, such as Java, C++, Advanced Business Application Programming (ABAP™) from SAP® AG, etc. Other types of programming languages are also useful.

Application 122 may store data in the application memory 123. Application memory 123 may include, for example, internal tables or other custom or standard data structures for maintaining and manipulating data used by application 122. Additionally, the data may have various standard types (e.g., Float, Integer, etc.) or custom types that are native to the application 122. For example, the application 122 may include internal tables for storing data. The internal tables may include custom data structures and custom data types.

The application server 120 may further include a dynamic bridge 124. The dynamic bridge 124 facilitates the integration of the application server 120 and the data server 127. More particularly, the dynamic bridge 124 may prepare a query script based on the source code of the application 122. The query script may include one or more placeholders that represent dynamic terms (e.g., conditions, variables, etc.) in the source code of the application 122. When the application 122 is executed at runtime, actual values of these dynamic terms may be determined from, for instance, user input. Based on these values, the dynamic bridge 124 may then generate static terms in a language that is compatible with the data server 127. The query script may then be processed to replace the placeholders with the respective static terms. The query script may be further validated to minimize security risk, and/or formatted to improve readability. The processed query script may be directly executed by the application server 120 to manage data (e.g., send, retrieve, update, etc.) stored at the data server 127. More details of these exemplary features will be provided in the following description.

Data server 127 may include a database management system (DBMS) 128 and a database 129. The DBMS 128 may include a set of programs to define, administer and process the database 129. A user at the client computer 150 may interact with a user interface 152 to communicate with the database 129 via the application server 120 and the DBMS 128.

In one implementation, database 129 is an in-memory database that relies primarily on the system's main memory for efficient computer data storage. More particularly, the data in the in-memory database resides in volatile memory and is not persistently stored on a hard drive, thereby allowing the data to be instantly accessed and scanned at a speed of several megabytes per millisecond. The in-memory database 129 allows seamless access to and propagation of high volumes of data in real-time. Parallel processing may further be achieved by using a multicore processor 114 in conjunction with the in-memory database 129. In-memory database technology includes systems such as SAP's HANA (high performance analytic appliance) in-memory computing engine.

Column-based data storage may further be implemented in the in-memory database 129, where data tables are stored as columns of data, in sequence and in compressed memory blocks. This may facilitate faster aggregation of data when calculations are performed on single columns. Alternatively, row-based data storage is also possible. In some implementations, instead of updating entire rows, only fields that have changed will be updated. This avoids having to lock entire data tables during updates to prevent conflicting modifications to a set of data. High levels of parallelization may be achieved, which is critical to real-time processing of live data streams and performing constant and substantially simultaneous updates.

It should be appreciated that the different components of the computer system 106 may be located on different machines. For example, the application server 120 and the data server 127 may be implemented on different physical machines or computer systems. It should further be appreciated that the different components of the client computer 150 may also be located on the computer system 106.

Figure 2:
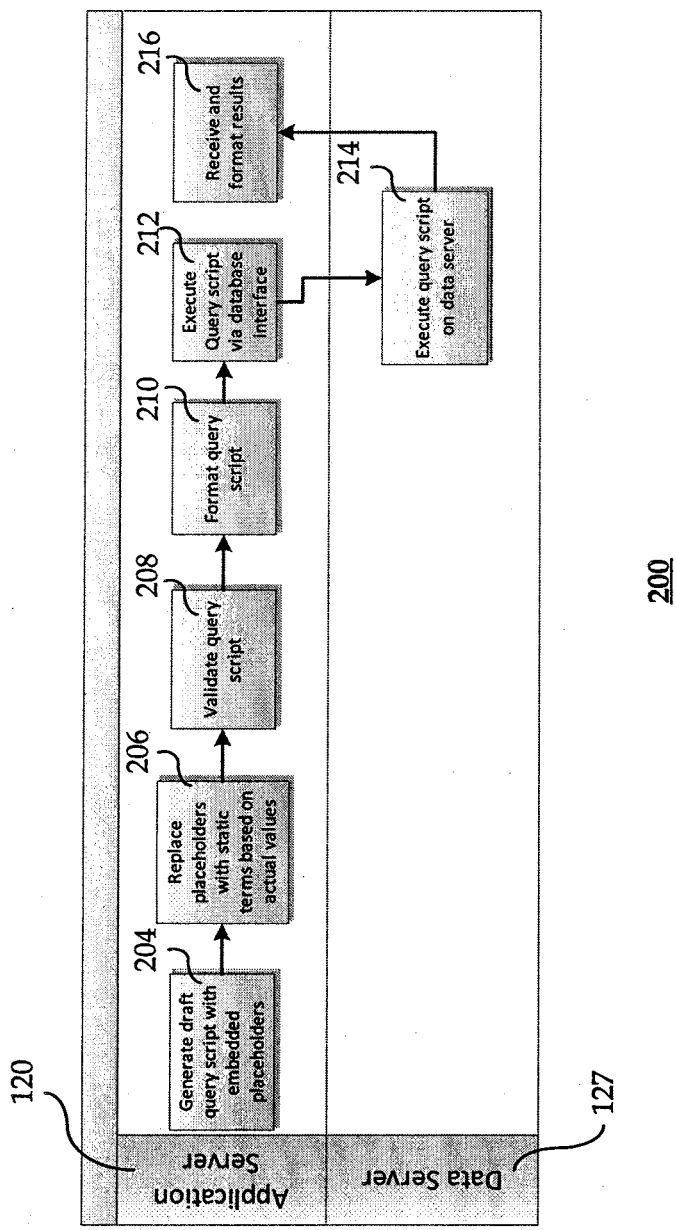
FIG. 2 shows an exemplary method.

FIG. 2 shows an exemplary method of dynamically bridging the application server 120 and the data server 127. The method 200 may be implemented by the system 100, as previously described with reference to FIG. 1. It should be noted that in the following discussion, reference will be made, using like numerals, to the features described in FIG. 1.

At 204, the dynamic bridge 124 in the application server 120 prepares a draft version of a query script based on an application 122. As discussed previously, the application 122 may be coded using a high-level programming language that allows dynamic selection of variables and conditions during run-time, such as Java, C++, Advanced Business Application Programming (ABAP) from SAP AG®, etc. In some implementations, the dynamic bridge 124 translates or paraphrases database-independent source code of the application 122 into equivalent query statements in the query script that are native to, or understood by, the DBMS 128. The query script may be based on the SQL language or extensions thereof (i.e. SQL-Script), or any other query language designed for managing data in the database 129. The translation may be performed automatically or semi-automatically with the assistance of a developer. By translating the application source code into a query script that is native to the DBMS 128, the capability of the data server 127 (e.g., in-memory computing) may be fully harnessed to provide enhanced performance.

The query script may be stored as a function module in the application server 120 as, for example, a plain or constant string. This advantageously allows the query script to be accessed by application developers for modification. In addition, version control of the query script may follow the code release process of the application.

The draft query script may include one or more placeholders embedded within. Placeholders represent dynamic terms that will later be replaced by static terms generated from actual values obtained during runtime of the application 122. Such placeholders may include predefined strings of one or more symbols. Different placeholders may be used to paraphrase different types of dynamic terms in the query script. The use of placeholders allows for the incorporation of dynamic terms while preserving the flow of business logic.

In some implementations, the placeholder represents a dynamic condition. For instance, in an ABAP application 122, an exemplary dynamic condition includes a WHERE filter condition that compares the attributes of a persistent class with free parameters or values declared during runtime. During the conversion at step 204, the dynamic condition in the original application source code may be replaced by a specific placeholder (e.g., :WHERE_XX_CONDITION) and embedded in the draft query script.

The dynamic condition may also be stored in a data structure, such as an internal table. For instance, in the case of an ABAP application 122, the internal table may be a range table (or selection table), which has four components (SIGN, OPTION, LOW, HIGH) to specify complex conditions in many statements in ABAP. During the conversion at step 204, such data structure may also be paraphrased by a specific placeholder (e.g., :WHERE_XX_CONDITION) and embedded in the draft query script.

In some implementations, the placeholder may represent a dynamic variable in the original application 122 source code. A variable is a named data object that stores changeable data under a particular name within the application memory 123, and it may represent some business logic in the original application code. A dynamic variable is a variable with a value that is dynamically declared while the application 122 is running. The value of the variable may be declared in response to, for example, a user making a selection (e.g., check box, radio button, pull-down menu, text box, etc.) via a user interface. During the conversion at step 204, the dynamic variable in the original application source code may be replaced by a specific placeholder (e.g., :XX) in the draft query script to indicate that it will be replaced by a static term during runtime.

At 206, the draft query script may be processed by replacing embedded placeholders with static terms generated based on actual values obtained during runtime of the application 122. As discussed previously, the placeholders may represent dynamic terms such as dynamic conditions and/or variables. The actual values associated with such dynamic terms may be provided by the user via the user interface. Static terms are then generated based on the actual values to replace the dynamic terms. For instance, a ":WHERE_XX_CONDITION" placeholder representing a range table may be replaced by a string including a WHERE condition with actual values.

At 208, the query script is validated. Validation may be performed to minimize security risks. For example, in the case of an SQL query script, the script may be validated to prevent SQL injection. SQL injection is a code injection technique often used to attack data driven applications by including portions of SQL statements in an entry field in an attempt to get the application server 120 to pass a newly formed rogue SQL command to the data server 127. Such code injection may be detected in the query script by identifying one or more sensitive words that may be indicative of security risks, such as "Drop table," "Drop Schema," "Create user," "Create Role," etc. The sensitive words may be predefined and stored in a blacklist or any other data structure.

When one or more sensitive words are detected, they are removed from the query script to block the execution of such rogue commands. In addition, a warning message may be displayed via the user interface 152 to inform and prompt the user to amend the input.

At 210, the query script is formatted for readability by the developer, so as to facilitate debugging and tracing. The query script may be formatted by adding or removing line breaks, white spaces, indentations, etc. in the query script. The query script may further be organized by grouping logically related sections of the code based on, for instance, keywords such as Where, Group by, Having, etc.

At 212, the query script is executed via a database interface. The database interface serves to establish connection with the data server 127 so as to execute the query script. For instance, ADBC may be used to establish a database connection between an ABAP application server 120 and a data server 127. ADBC is an API for the native SQL interface of the AS ABAP that is based on ABAP objects. The methods provided by ADBC make it possible to send database-specific SQL commands and access SQL functionalities to the data server 127.

At 214, the query script is executed on the data server 127. The DBMS 128 may parse the query script and create the execution plan for executing the query statements. The DBMS 128 may then execute the plan and fetch the results from the database 129.

At 216, the database query results are received and formatted by the dynamic bridge 124. The results may be formatted in, for instance, a data structure (e.g., ABAP internal table) that is native to the application server 120. Other types of data structures, including standard data structures, may also be used. With the formatted results, the remaining non-translated part of the application 122 may continue to be executed.

Figures 3A, 3B:
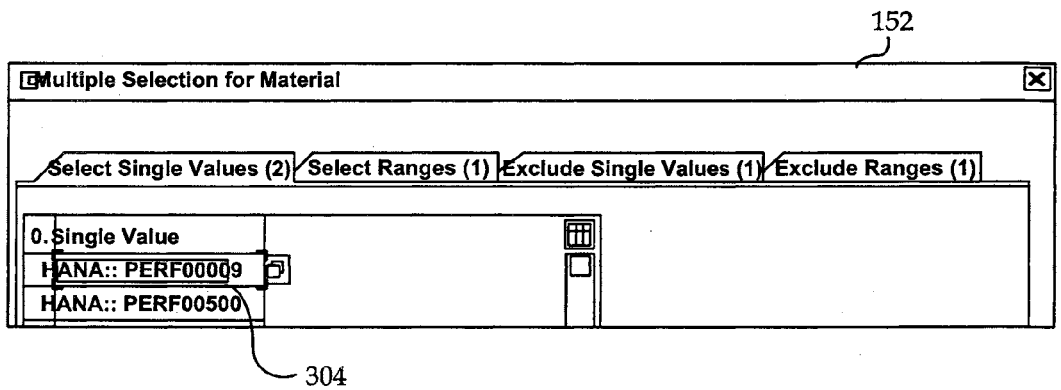
FIG. 3a shows an exemplary user interface for obtaining user input during runtime.
FIG. 3b shows an exemplary dynamic data structure.

FIGS. 3a-b illustrate an example of how user input may be translated to a query script in accordance with one implementation of the present framework. More particularly, FIG. 3a shows an exemplary user interface 152 for obtaining user input during runtime. The user interface 152 may be displayed when an ABAP application 122 is executed. It allows the user to select values 304 to be entered into a data structure containing dynamic conditions. The user may, for example, select a single value or range of values, or exclude a single value or range of values, in a range table. The values or range of values may be predefined and displayed in a scrollable list. Alternatively, the user may also enter custom values or range of values.

FIG. 3b shows an exemplary data structure 306 that may be displayed via the user interface 152. As shown, the data structure 306 is a range table used in ABAP applications. As discussed previously, a range table is an internal table that has four components (SIGN, OPTION, LOW, HIGH) for specifying complex criteria or conditions in many statements in ABAP. The range table 306 may be defined in the ABAP application code as a selection criteria as follows, where p_matnr is the range table 306 corresponding to user input:

Select * from XX where MATNR in p_matnr    (1)

The dynamic "Select" term in the ABAP application code may be replaced by a "Where" condition placeholder (e.g., ":where_matnr") in the draft SQL query script. During runtime, the user selects the desired values 304 that fill the fields in the range table 306. The "Where" condition placeholder embedded in the draft query script may then be replaced by a static term with actual user-selected values 304 at runtime, such as follows:

Where (MATNR='HANA::PERF00009' AND
    MATNR='HANA::PERF00500') OR
    (MATNR>='HANA::HDR:06001' AND
    MATNR<='HANA::HDR:06600') AND
    (MATNR<>'124133-100') AND
    (MATNR<'HANA::HDR:06800' OR
    MATNR>'HANA::HDR:06908')    (2)

In some implementations, a general purpose function module may be used to perform the conversion of the "Select" criteria stored in the range table (e.g., term (1)) into the "Where" condition string (e.g., term (2)) with user-selected values obtained at runtime. The function module may be programmed in the same language as the application 122 (e.g., ABAP) and stored in the application memory 123. After the function module generates the static "Where" condition string, the placeholder (e.g., ":where_matnr") in the draft query script may then be replaced by the resulting "Where" condition string (e.g., term (2)).

In some implementations, another function module may be used to provide a database interface between the application server 120 and the data server 127. ADBC classes may be used to establish connection with the data server, execute the query script, retrieve results to an internal table and report errors when an exception is thrown. Other types of data interface classes are also useful. The function module may accept three input parameters: PV_QUERY, PV_SCHEMA and PV_DONT_CLOSE_CONN. PV_QUERY represents the query script that has been translated from the application code. PV_SCHEMA represents an optional parameter to change the default database schema. Finally, PV_DONT_CLOSE_CONN represents a flag to indicate whether the connection needs to be closed after execution of the query script and retrieval of database results. By default, the flag may be set to, for example, a " " (space), indicating that the connection needs to be closed. The flag may also be set to, for instance, an "X", indicating that the connection is to remain open. This may be useful in situations when, for example, data needs to be stored in a temporary table in the data server 127 at connection level and retrieved later. The connection may then be closed after the final data retrieval. The function module may then output a data structure such as a generic table that is used to store data retrieved from the database 129. Any other data structure may also be used, as long as it is the same as the returned data structure defined in the query script.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claim is:
1. A method of dynamically bridging an application server and a data server, comprising:
  generating, by the application server, a query script by paraphrasing source code of an application, wherein the query script includes at least one placeholder that represents a dynamic term in the source code;
  processing, by the application server, the query script by replacing the placeholder with a static term generated based on one or more values received during execution of the application;
  validating, by the application server, the query script to minimize security risks; and executing, by the application server via a database interface, the query script to manage data at a data server.

2. A method of dynamically bridging an application server and a data server, comprising:
generating, by the application server, a query script by paraphrasing source code of an application, wherein the query script includes at least one placeholder that represents a dynamic term in the source code;
processing, by the application server, the query script by replacing the placeholder with a static term generated based on one or more values received during execution of the application; and
executing the query script to manage data at a data server.

3. The method of claim 2 wherein the source code comprises ABAP™ code.

4. The method of claim 2 wherein the data server comprises an in-memory database.

5. The method of claim 2 wherein generating the query script comprises paraphrasing database-independent source code of the application into equivalent query statements that are native to the data server.

6. The method of claim 5 wherein the query statements are based on SQL language or extensions thereof.

7. The method of claim 2 further comprising storing the query script as a function module in the application server.

8. The method of claim 2 wherein the dynamic term comprises a dynamic condition.

9. The method of claim 8 wherein the dynamic condition comprises a WHERE condition.

10. The method of claim 8 wherein the dynamic condition is stored in an internal table.

11. The method of claim 10 wherein the internal table comprises a range table.

12. The method of claim 2 wherein the dynamic term comprises a dynamic variable.

13. The method of claim 2 wherein the one or more values are received in response to a user making a selection via a user interface.

14. The method of claim 2 further comprising validating the query script to minimize security risks.

15. The method of claim 14 wherein validating the query script comprises detecting one or more predefined words in the query script.

16. The method of claim 2 further comprising formatting the query script for readability.

17. The method of claim 2 further comprising executing, at the application server, the query script via a database interface that establishes a connection with the data server.

18. The method of claim 2 further comprising receiving, by the application server, query results from the data server and formatting the query results in a data structure native to the application server.

19. A non-transitory computer-readable medium having stored thereon program code, the program code executable by a computer to:
generate, at an application server, a query script by paraphrasing source code of an application, wherein the query script includes at least one placeholder that represents a dynamic term in the source code;
process, at the application server, the query script by replacing the placeholder with a static term generated based on one or more values received during execution of the application; and
execute the query script to manage data at a data server.

20. A system comprising:
a non-transitory memory device for storing computer readable program code; and
a processor in communication with the memory device, the processor being operative with the computer readable program code to:
generate, at an application server, a query script by paraphrasing source code of an application, wherein the query script includes at least one placeholder that represents a dynamic term in the source code;
process, at the application server, the query script by replacing the placeholder with a static term generated based on one or more values received during execution of the application; and
execute the query script to manage data at a data server.

* * * * *